United States Patent
Sugimoto et al.

(10) Patent No.: US 9,942,419 B2
(45) Date of Patent: Apr. 10, 2018

(54) IMAGE FORMING APPARATUS, IMAGE FORMING METHOD, AND NON-TRANSITORY COMPUTER READABLE MEDIUM

(71) Applicant: FUJI XEROX CO., LTD., Tokyo (JP)

(72) Inventors: Shuichi Sugimoto, Kanagawa (JP); Masaomi Sakamoto, Kanagawa (JP); Shinsuke Sugi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/215,686

(22) Filed: Jul. 21, 2016

(65) Prior Publication Data
US 2017/0195500 A1    Jul. 6, 2017

(30) Foreign Application Priority Data
Jan. 6, 2016  (JP) ................................. 2016-001314

(51) Int. Cl.
*H04N 1/46*  (2006.01)
*H04N 1/00*  (2006.01)
(Continued)

(52) U.S. Cl.
CPC ..... *H04N 1/00005* (2013.01); *H04N 1/00023* (2013.01); *H04N 1/00045* (2013.01); *H04N 1/00084* (2013.01); *H04N 1/00129* (2013.01); *H04N 1/00962* (2013.01); *H04N 1/405* (2013.01); *H04N 1/4097* (2013.01); *H04N 1/50* (2013.01); *G06K 2215/0085* (2013.01); *G06K 2215/0094* (2013.01); *H04N 2201/0005* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,953,238 B2 * | 10/2005 | Koitabashi | ............. | B41J 2/2139 347/19 |
| 7,661,787 B2 * | 2/2010 | Hoshiyama | .......... | G06K 15/027 347/15 |

(Continued)

FOREIGN PATENT DOCUMENTS

| JP | 2012-237874 A | 12/2012 |
|---|---|---|
| JP | 2012237874 A | * 12/2012 |

*Primary Examiner* — Dung D Tran
(74) *Attorney, Agent, or Firm* — Sughrue Mion, PLLC

(57) ABSTRACT

An image forming apparatus includes a forming unit, a detecting unit, and a creating unit. The forming unit forms a first image and at least one of second and third images on a recording medium. The first image is used to create correction data for gradation correction. The second image is used to detect a streak in a cross direction which is produced in the first image. The cross direction intersects a conveying direction in which the recording medium is conveyed. The third image is used to detect the streak in the conveying direction which is produced in the first image. The detecting unit detects the streak by using at least one of the second and third images. When the detecting unit detects the streak, the creating unit creates the correction data on the basis of a portion other than a region corresponding to the streak in the first image.

11 Claims, 4 Drawing Sheets

(51) Int. Cl.
*H04N 1/50* (2006.01)
*H04N 1/405* (2006.01)
*H04N 1/409* (2006.01)

(56) References Cited

U.S. PATENT DOCUMENTS

| | | | | |
|---|---|---|---|---|
| 7,773,774 B2* | 8/2010 | Rasmussen | ............ | B41J 29/393 |
| | | | | 358/3.23 |
| 8,086,122 B2* | 12/2011 | Nakane | .............. | G03G 15/5062 |
| | | | | 399/49 |
| 8,570,601 B2* | 10/2013 | Skinner | ................ | H04N 1/6036 |
| | | | | 358/1.4 |
| 8,649,068 B2* | 2/2014 | Herloski | ............ | G03G 15/5062 |
| | | | | 358/1.1 |
| 8,736,894 B2* | 5/2014 | Kuo | ........................ | H04N 1/506 |
| | | | | 358/1.2 |
| 8,971,740 B2* | 3/2015 | Harashima | ............ | G03G 15/205 |
| | | | | 399/49 |
| 9,049,312 B2* | 6/2015 | Liu | ..................... | H04N 1/00005 |
| 9,282,199 B2* | 3/2016 | Hashizume | ......... | H04N 1/00005 |
| 2003/0085949 A1* | 5/2003 | Koitabashi | ............. | B41J 2/2139 |
| | | | | 347/43 |
| 2005/0134624 A1* | 6/2005 | Mizes | .................... | G06K 15/02 |
| | | | | 347/19 |
| 2005/0265739 A1* | 12/2005 | Hamby | ................... | G03G 15/00 |
| | | | | 399/49 |
| 2005/0286742 A1* | 12/2005 | Rasmussen | ............ | B41J 29/393 |
| | | | | 382/112 |
| 2007/0041060 A1* | 2/2007 | Kikuchi | ............... | H04N 1/6033 |
| | | | | 358/504 |
| 2008/0159763 A1* | 7/2008 | Nakane | ................... | G03G 15/5062 |
| | | | | 399/49 |
| 2013/0293611 A1* | 11/2013 | Ueshima | ................ | B41J 2/125 |
| | | | | 347/12 |
| 2014/0177016 A1* | 6/2014 | Wilsher | ............ | H04N 1/00045 |
| | | | | 358/504 |

* cited by examiner

IMAGE FORMING APPARATUS, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-001314 filed Jan. 6, 2016.

BACKGROUND

Technical Field

The present invention relates to an image forming apparatus, an image forming method, and a non-transitory computer readable medium.

SUMMARY

According to an aspect, there is provided an image forming apparatus including a forming unit, a detecting unit, and a creating unit. The forming unit forms a first image and at least one of a second image and a third image on a recording medium. The first image is used to create correction data for gradation correction. The second image is used to detect a streak portion which extends in a cross direction and which is produced in the first image. The cross direction intersects a conveying direction in which the recording medium is conveyed. The third image is used to detect the streak portion which extends in the conveying direction and which is produced in the first image. The detecting unit detects the streak portion by using at least one of the second image and the third image. The second image and the third image are formed by the forming unit. When the detecting unit detects the streak portion, the creating unit creates the correction data on the basis of a portion other than a streak-portion region corresponding to the streak portion in the first image.

BRIEF DESCRIPTION OF THE DRAWINGS

Exemplary embodiments of the present invention will be described in detail based on the following figures, wherein.

DETAILED DESCRIPTION

Exemplary embodiments for carrying out the present invention will be described in detail below with reference to the drawings.

Figure 1:
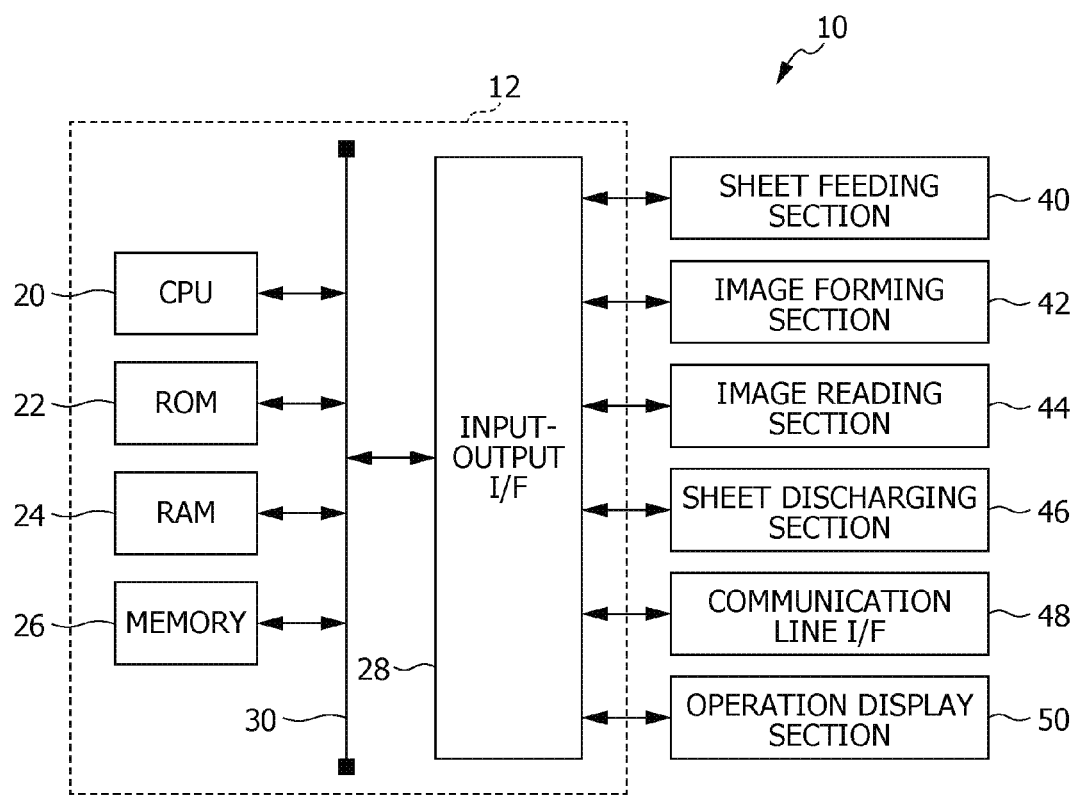
FIG. 1 is a block diagram illustrating the configuration of an image forming apparatus according to an exemplary embodiment.

Referring to FIG. 1, the configuration of an image forming apparatus 10 according to an exemplary embodiment will be described. In the description below, yellow is represented by Y; magenta, by M; cyan, by C; and black, by K. When components and toner images are to be differentiated in terms of color, a color code (Y, M, C, or K) corresponding to the color of each of the components and the toner images is added to the end of the reference character. In the description below, when components and toner images are collectively referred to without differentiating them in terms of color, the color code at the end of a reference character is omitted.

As illustrated in FIG. 1, the image forming apparatus 10 according to the present exemplary embodiment includes a controller 12, a sheet feeding section 40, an image forming section 42, an image reading section 44, a sheet discharging section 46, a communication line I/F (interface) 48, and an operation display section 50.

The controller 12 according to the present exemplary embodiment includes a central processing unit (CPU) 20 controlling overall operations in the image forming apparatus 10, and a read only memory (ROM) 22 storing various programs, various parameters, and the like in advance. The controller 12 also includes a random access memory (RAM) 24 used as a work area or the like when the CPU 20 executes various programs, a nonvolatile memory 26 such as a flash memory, and an input-output I/F 28.

The units, i.e., the CPU 20, the ROM 22, the RAM 24, the memory 26, and the input-output I/F 28, are connected to one another via a bus 30 including an address bus, a data bus, and a control bus. The sheet feeding section 40, the image forming section 42, the image reading section 44, the sheet discharging section 46, the communication line I/F 48, and the operation display section 50 are connected to the input-output I/F 28.

The sheet feeding section 40 according to the present exemplary embodiment includes a sheet accommodating section in which multiple sheets P (see also FIG. 2) as exemplary recording media are stacked, and a supply mechanism for taking the sheets P stacked in the sheet accommodating section, one by one and supplying the sheets P to the image forming section 42 described below.

The image forming section 42 according to the present exemplary embodiment includes image forming units for colors of Y, M, C, and K. The image forming unit for each color includes an image carrier, a charger which charges the surface of the image carrier, and an exposure device which emits exposure light for forming an electrostatic latent image on the surface of the charged image carrier. The image forming unit for each color also includes a developing unit which develops, by using a developer, the electrostatic latent image formed on the surface of the image carrier through the exposure device emitting exposure light and which visualizes the electrostatic latent image as a toner image.

The image forming section 42 includes an endless intermediate transfer belt and also includes first transfer rollers, each of which is disposed in such a manner as to face a corresponding one of the image carriers for the colors with the intermediate transfer belt interposed between the first transfer roller and the image carrier. In the above-described configuration, the toner images of the colors, Y, M, C, and K, which are sequentially formed on the image carriers in the image forming units for the colors are transferred onto the intermediate transfer belt by using the first transfer rollers for the colors in a superimposed manner.

The image forming section 42 includes an auxiliary roller and a second transfer roller which is disposed in such a manner as to face the auxiliary roller with the intermediate transfer belt interposed between the second transfer roller and the auxiliary roller and which transfers, onto a conveyed sheet P, the toner image having been transferred onto the intermediate transfer belt. The second transfer roller is grounded, and the auxiliary roller serves as a counter electrode for the second transfer roller. By applying a second transfer voltage to the auxiliary roller, the toner image is transferred from the intermediate transfer belt to the sheet P.

The image forming section 42 also includes a fixing device for fixing the toner image having been transferred to the sheet P, through pressure and heating.

The image reading section 44 according to the present exemplary embodiment includes an image reading sensor such as a charge coupled device (CCD) line sensor. The image reading section 44 reads an image formed on a sheet P by the image forming section 42, and outputs image data obtained through the reading operation, via the input-output I/F 28 to the CPU 20.

The sheet discharging section 46 according to the present exemplary embodiment includes a discharging section onto which sheets P are discharged, and a discharging mechanism for discharging, onto the discharging section, a sheet P on which an image has been formed by the image forming section 42 and from which the image is read by the image reading section 44.

The communication line I/F 48 according to the present exemplary embodiment receives/transmits communication data from/to external apparatuses. The operation display section 50 according to the present exemplary embodiment receives an instruction for the image forming apparatus 10 from a user, and displays various types of information about the operational condition and the like of the image forming apparatus 10 to the user. The operation display section 50 includes, for example, a display whose display surface on which various types of information and display buttons for receiving an operational instruction by executing programs are displayed is provided with a touch panel. The operation display section 50 also includes hardware keys, such as a numerical keypad and a start button.

The image forming apparatus 10 according to the present exemplary embodiment is provided with a creating function of creating correction data used in gradation correction in which gradation characteristics of image data indicating an image that is to be formed are corrected.

Figure 2:
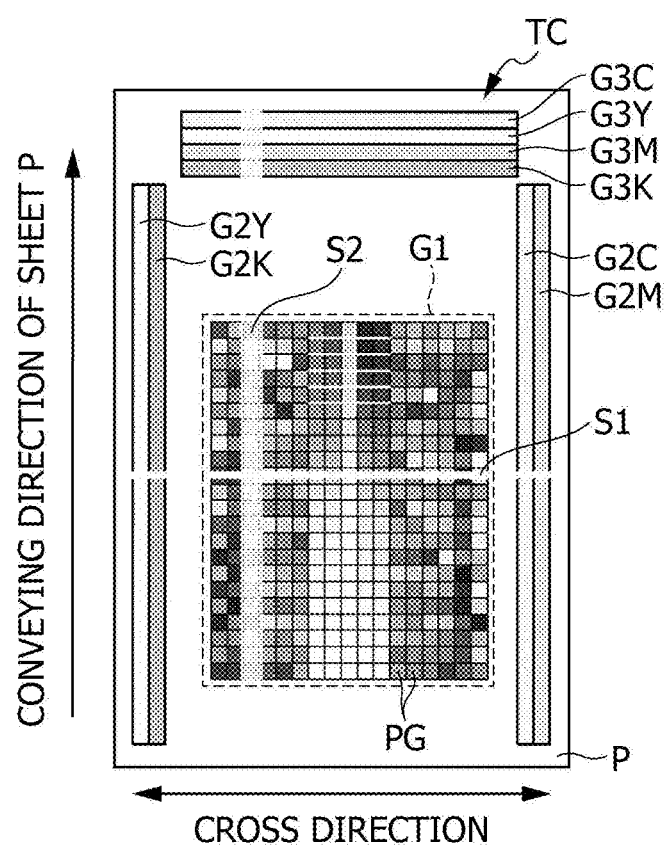
FIG. 2 is a plan view illustrating an exemplary test chart according to the exemplary embodiment.

Referring to FIG. 2, a test chart TC formed on a sheet P by the image forming section 42 to achieve the creating function will be described. As illustrated in FIG. 2, the test chart TC according to the present exemplary embodiment includes a first image G1, second images G2Y, G2M, G2C, and G2K, and third images G3Y, G3M, G3C, and G3K.

The first image G1 according to the present exemplary embodiment which is used to create correction data is an image in which multiple rectangular patch images PG, in each of which the density and the color are different from those of another patch image PG, are arranged in a matrix.

The second images G2 according to the present exemplary embodiment are images used to detect a streak portion S1 which is produced in the first image G1 in the cross direction (hereinafter simply referred to as the "cross direction") intersecting (in the present exemplary embodiment, being orthogonal to) the conveying direction in which a sheet P is conveyed (hereinafter simply referred to as the "conveying direction"). The lines which are arranged in the cross direction and which constitute the second images G2 are formed in such a manner as to correspond to the lines which are arranged in the cross direction and which constitute the first image G1. Herein, "being orthogonal" means a state of being orthogonal with an allowable range including an error in an installation position or the like of a component in the image forming apparatus 10. Herein, the cross direction indicates the main scanning direction used when an image is formed by the image forming section 42.

Specifically, each of the second images G2 is a belt-like image whose length in the conveying direction in which a sheet P is conveyed is equal to or larger than that of the first image G1. The second image G2 has a density that is uniform in the image. That is, the second image G2 is formed so as to cover the range in which the first image G1 which is formed extends in the conveying direction. The second image G2 is also a halftone image. The second images G2Y and G2K and the second images G2C and G2M are formed at opposite positions in such a manner as to be located on opposite sides of the first image G1.

The third images G3 according to the present exemplary embodiment are used to detect a streak portion S2 which is produced in the first image G1 in the conveying direction. The third images G3 are formed in such a manner that the length in the cross direction of each line included in the third images G3 corresponds to the length in the cross direction of each line included in the first image G1.

Specifically, each of the third images G3 is a belt-like image whose length in the cross direction is equal to or larger than that of the first image G1. The third image G3 has a density that is uniform in the image. That is, the third image G3 is formed so as to cover the range in which the first image G1 which is formed extends in the cross direction. The third image G3 is also a halftone image. The third images G3 are formed on one side of the first image G1 (in the example illustrated in FIG. 2, on the upper side).

In the image forming apparatus 10 according to the present exemplary embodiment, image data (hereinafter referred to as "test image data") indicating the test chart TC is stored in the memory 26 in advance.

In the image forming apparatus 10 according to the present exemplary embodiment, for example, attachment of toner to the light source of an exposure device of the image forming section 42 may cause the streak portions S1 and S2 to be produced in the first image G1, as illustrated in FIG. 2 as an example. In this case, when correction data is created from image data obtained by reading the first image G1 by using the image reading section 44, accuracy in the correction data is reduced. Hereinafter, when the streak portions S1 and S2 are collectively referred to, the number at the end of a reference character is omitted, and an expression of "streak portion S" is simply used.

Therefore, the image forming apparatus 10 according to the present exemplary embodiment detects a streak portion S1 whose longitudinal direction is the cross direction, on the basis of image data obtained by reading the second images G2 by using the image reading section 44. The image forming apparatus 10 also detects the streak portion S2 whose longitudinal direction is the conveying direction, on the basis of image data obtained by reading the third images G3 by using the image reading section 44. When the image forming apparatus 10 detects at least one of the streak portion S1 and the streak portion S2, the image forming apparatus 10 creates correction data on the basis of portions other than a region corresponding to the streak portion S detected in the first image G1.

Figure 3:
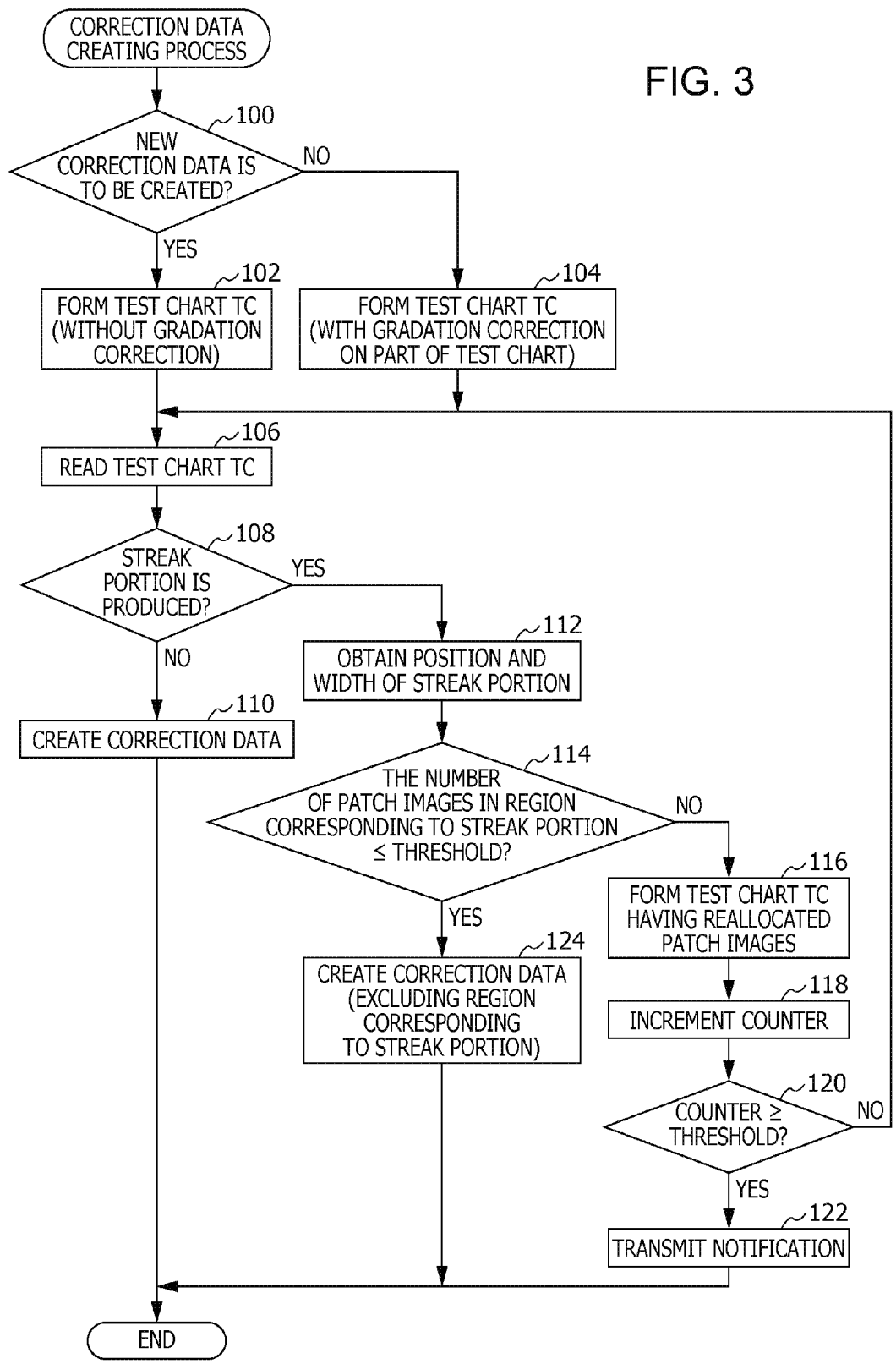
FIG. 3 is a flowchart illustrating a process flow for a program for a correction data creating process, according to the exemplary embodiment.

Referring to FIG. 3, operation of the image forming apparatus 10 according to the present exemplary embodiment will be described. FIG. 3 is a flowchart illustrating a process flow for a program for a correction data creating process which is executed by the CPU 20. The program for the correction data creating process is executed, for example, when a user inputs an instruction to start performing the process through the operation display section 50, or every time images have been formed on a predetermined number of sheets P (for example, 1000 sheets). The program for the correction data creating process has been installed in the ROM 22 in advance. In the present exemplary embodiment, to avoid complicated description, a description will be made under the assumption that a counter described below is initialized to zero (0) when execution of the correction data creating process is started.

In step 100 in FIG. 3, the CPU 20 determines whether or not new correction data is to be created. Specifically, the CPU 20 determines whether or not correction data is stored in the memory 26. In step 100, for example, when a user inputs an instruction to create new correction data again through the operation display section 50, the CPU 20 may determine that new correction data is to be created. If the determination result in step 100 is positive, the CPU 20 causes the process to proceed to step 102. If the determination result in step 100 is negative, the CPU 20 causes the process to proceed to step 104.

In step 102, the CPU 20 reads the test image data from the memory 26, and controls the image forming section 42 on the basis of the test image data which has been read, so as to form the test chart TC on a sheet P without performing gradation correction. Then, the process proceeds to step 106.

In contrast, in step 104, the CPU 20 reads the test image data and the correction data which are stored in the memory 26. The CPU 20 performs gradation correction on the basis of the correction data which has been read, on image data for the portion corresponding to the first image G1 in the test image data which has been read. The CPU 20 creates image data which is data for the portions corresponding to the second images G2 and the third images G3 and which is not subjected to gradation correction. The CPU 20 controls the image forming section 42 on the basis of the created image data so as to form the test chart TC on a sheet P. Then, the process proceeds to step 106.

In step 106, the CPU 20 controls the image reading section 44 so that the test chart TC which has been formed on the sheet P is read, and obtains image data (hereinafter referred to as "read-image data") obtained through the reading operation.

In step 108 which is the next step, the CPU 20 determines whether or not the streak portions S1 and S2 are produced, on the basis of the read-image data obtained in step 106.

Specifically, the CPU 20 detects the streak portion S1 on the basis of image data for the portion corresponding to the second images G2 in the read-image data. The CPU 20 also detects the streak portion S2 on the basis of image data for the portion corresponding to the third images G3 in the read-image data.

Figure 4:
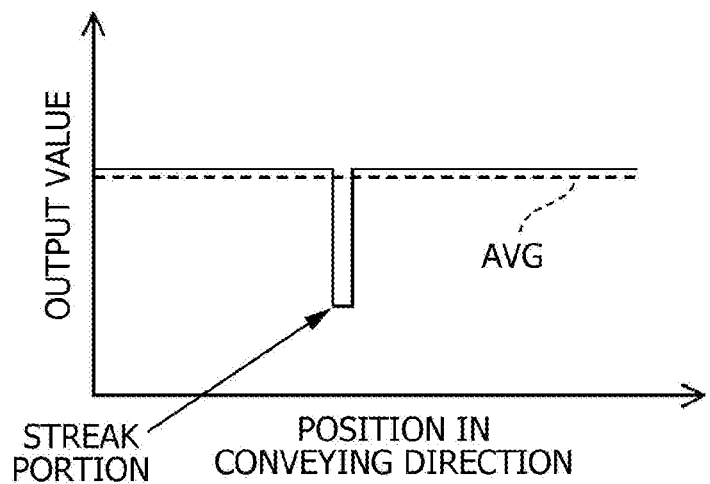
FIG. 4 is a graph for describing a process of detecting a streak portion, according to the exemplary embodiment.

Referring to FIG. 4, a process of detecting the streak portion S1 on the basis of image data (hereinafter referred to as "partial image data G2Y") for the portion corresponding to the second image G2Y in the read-image data will be described as an example. The horizontal axis in FIG. 4 represents position in the conveying direction of each pixel in the partial image data G2Y, and the vertical axis in FIG. 4 represents output value (pixel value) of each pixel in the partial image data G2Y which is obtained from the image reading section 44.

As illustrated in FIG. 4, the CPU 20 calculates the average AVG of output values for one specific line in which pixels are aligned in the conveying direction and which is included in the partial image data G2Y. When pixels, in each of which the absolute value of the difference between an output value and the average AVG is equal to or more than a threshold TH1 and the number of which is equal to or more than a threshold TH2, are continuously aligned, the CPU 20 detects occurrence of the streak portion S1. Values predetermined, for example, in accordance with required accuracy in detecting a streak portion may be applied to the threshold TH1 and the threshold TH2.

In this example, the case in which the streak portion S1 is detected by using output values for one specific line in the partial image data G2Y is described. This is not limiting. The streak portion S1 may be detected by using output values of multiple lines in the partial image data G2Y. An exemplary embodiment in this case is such that multiple lines in the partial image data G2Y are used to detect the streak portion S1 by using data obtained by calculating the average of the output values of pixels that are aligned in the cross direction at each pixel position arranged in the conveying direction. Alternatively, for example, without using the average AVG, the streak portion S1 may be detected by comparing output values with a threshold.

In the processes in steps described below, a "streak portion S" which is simply described means a streak portion S detected in step 108.

If the determination result in step 108 is negative, the CPU 20 causes the process to proceed to step 110. In step 110, the CPU 20 creates correction data which causes density in an image that is to be formed on a sheet P to match or be brought close to the target density, on the basis of image data for the portion corresponding to the first image G1 in the test image data stored in the memory 26 and on the basis of that in the read-image data obtained in step 106. The CPU 20 stores (performs an update operation with) the created correction data in the memory 26. Then, the correction data creating process is ended.

If the determination result in step 108 is positive, the CPU 20 causes the process to proceed to step 112. In step 112, the CPU 20 obtains the position of the streak portion S on the basis of the positions of pixels for the streak portion S detected in step 108. The CPU 20 obtains the width of the streak portion S on the basis of the number of pixels which are continuously aligned and for each of which the absolute value of the difference between the output value and the average AVG is equal to or more than the threshold TH1, in the streak portion S detected in step 108.

In step 114 which is the next step, the CPU 20 specifies patch images PG, each of which is formed at a position at which at least part of the streak portion S is present, on the basis of the test image data and the position and the width of the streak portion S which are obtained in step 112. The CPU 20 determines whether or not the number of specified patch images PG is equal to or less than a threshold TH3. A value predetermined in accordance with required accuracy or the like in correction data may be applied to the threshold TH3. If the determination result in step 114 is negative, the CPU 20 causes the process to proceed to step 116.

In step 116, the CPU 20 creates image data (hereinafter referred to as "image-after-relocation data") in which the patch images PG specified in step 114 are rearranged in a region in which the streak portion S whose position and width are obtained in step 112 is not included and in which other images are not formed. The CPU 20 controls the image forming section 42 on the basis of the created image-after-relocation data so as to form the test chart TC on a next sheet P. When correction data is stored in the memory 26, similarly to the process in step 104, the CPU 20 performs gradation correction on part of the image-after-relocation data, and then forms the test chart TC on the next sheet P.

When correction data is not stored in the memory 26, similarly to the process in step 102, the CPU 20 forms the test chart TC on the next sheet P on the basis of the image-after-relocation data which is not subjected to gradation correction.

In step 118 which is the next step, the CPU 20 increments the counter by 1 (counter←counter+1). In step 120 which is the next step, the CPU 20 determines whether or not the counter is equal to or more than a threshold TH4. If the determination result is negative, the CPU 20 causes the process to return back to step 106. If the determination result is positive, the CPU 20 causes the process to proceed to step 122. The threshold TH4 is used to avoid infinite repetition of the processes from step 106 to step 118, and may be set as appropriate.

In step 122, the CPU 20 displays and notifies information indicating that the amount of occurrence of the streak portion S is more than an allowable range, on the display of the operation display section 50. Then the correction data creating process is ended.

In contrast, if the determination result in step 114 is positive, the CPU 20 causes the process to proceed to step 124. In step 124, similarly to step 110, the CPU 20 creates correction data on the basis of image data for a region in which the patch images PG specified as including the streak portion S in step 114 are not included in a portion corresponding to the first image G1 in the read-image data and on the basis of a region corresponding to the test image data, so as to store (perform an updating operation with) the created correction data in the memory 26. Then, the correction data creating process is ended.

In the above-described exemplary embodiment, the case in which both of the second image set G2 and the third image set G3 are formed on a sheet P is described. This is not limiting. For example, either of the second image set G2 and the third image set G3 may be formed on a sheet P.

In the above-described exemplary embodiment, the case in which the second images G2 are formed at opposite positions in such a manner as to be located on opposite sides of the first image G1 is described. This is not limiting. For example, the second images G2 may be formed on only one side of the first image G1 (for example, on the left in FIG. 2).

In the above-described exemplary embodiment, the case is described in which the second images G2 are formed at opposite positions in such a manner that the second images G2 are located on opposite sides of the first image G1 and that the number of images on one side of the first image G1 is equal to that on the other side. This is not limiting. For example, the second images G2 may be formed at opposite positions in such a manner that the second images G2 are located on opposite sides of the first image G1 and that the number of images on one side of the first image G1 is different from that on the other side. An exemplary embodiment in this case is such that the second image G2Y is formed on the left of the first image G1 and the second images G2K, G2C, and G2M are formed on the right of the first image G1.

In the above-described exemplary embodiment, the case in which the third images G3 are formed only on one side of the first image G1 (in FIG. 2, the upper side) is described. This is not limiting. For example, the third images G3 may be formed only on the other side of the first image G1 (for example, the lower side in FIG. 2). Alternatively, for example, the third images G3 may be formed at opposite positions in such a manner as to be located on opposite sides of the first image G1.

In the above-described exemplary embodiment, the case in which the image reading section 44 disposed in the image forming apparatus 10 reads the test chart is described. This is not limiting. An image reading apparatus outside of the image forming apparatus 10 may read the test chart. An exemplary embodiment in this case is such that the image forming apparatus 10 obtains, from an external image reading apparatus, image data obtained by reading the test chart by using the image reading apparatus, and, similarly to the above-described exemplary embodiment, creates correction data on the basis of the obtained image data.

In the above-described exemplary embodiment, an image processing apparatus outside of the image forming apparatus 10 may perform the process, which is performed in step 104, of performing gradation correction on part of the test image data and not performing gradation correction on the other part. An exemplary embodiment in this case is such that an external image processing apparatus obtains correction data and test image data from the image forming apparatus 10, and creates image data in which gradation correction is performed on part of the obtained test image data and in which gradation correction is not performed on the other part, so as to transmit the created image data to the image forming apparatus 10.

Figure 5:
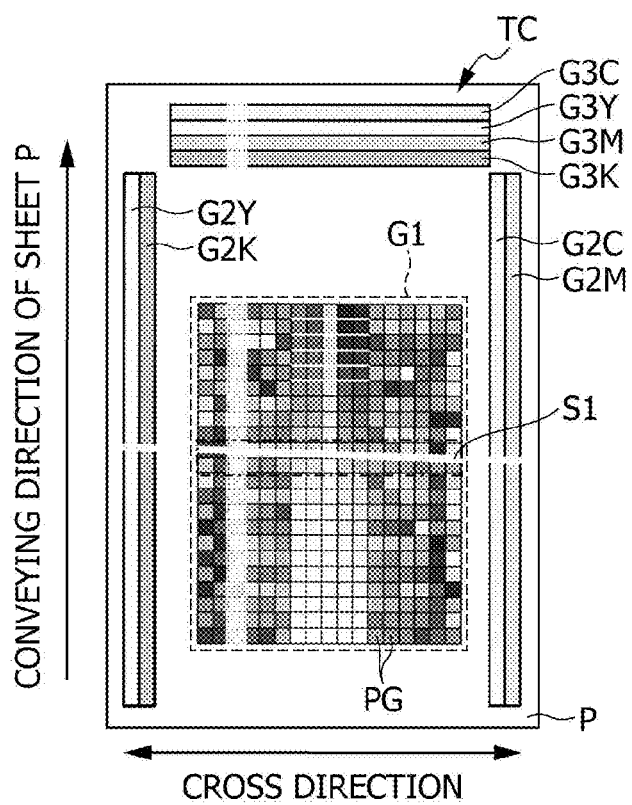
FIG. 5 is a plan view for describing a process of creating correction data, according to an exemplary modified embodiment.

In the above-described exemplary embodiment, a configuration may be employed in which, as illustrated in FIG. 5, when an oblique streak portion S1 is produced, all of the patch images PG (patch images PG surrounded by a long dashed short dashed line) corresponding to the position of the streak portion S1 detected by using the second images G2Y and G2K and that detected by using the second images G2C and G2M are not used to create correction data. In this case, for example, the following configuration may be employed. An inclination of the streak portion S1 is calculated from the difference between the position of the streak portion S1 detected by using the second images G2Y and G2K and that detected by using the second images G2C and G2M. Then, only patch images PG presumed to include the streak portion S1 on the basis of the calculated inclination of the streak portion S1 are not used to create correction data.

In the above-described exemplary embodiment, the case in which the program for the correction data creating process has installed in the ROM 22 in advance is described. This is not limiting. For example, the program for the correction data creating process may be provided by storing the program in a storage medium such as a compact disk read only memory (CD-ROM), or may be provided through a network.

In the above-described exemplary embodiment, the case in which, by executing programs, the correction data creating process is achieved by using a computer through a software configuration is described. This is not limiting. For example, the correction data creating process may be achieved through a hardware configuration or through a combination of a hardware configuration and a software configuration.

In addition, the configuration of the image forming apparatus 10 (see FIG. 1) which is described in the present exemplary embodiment is an example. Needless to say, without departing from the gist of the present invention, unnecessary parts may be deleted, and new parts may be added.

The process flow for the program for the correction data creating process (see FIG. 3) which is described in the above-described exemplary embodiment is also an example. Needless to say, without departing from the gist of the present invention, unnecessary steps may be deleted, new steps may be added, and the process order may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
at least one hardware processor configured to implement:
a forming unit that forms a first image and at least one of a second image and a third image on a recording medium;
a detecting unit that detects a streak portion in the first image by using at least one of the second image and the third image; and
a creating unit that, in response to the detecting unit detecting the streak portion, creates correction data on a basis of a portion other than a streak-portion region corresponding to the streak portion in the first image,
wherein the at least one of the second image and the third image is outside of the first image,
wherein the second image is formed in such a manner that lines arranged in a cross direction and included in the second image correspond to lines arranged in the cross direction and included in the first image, and
wherein the third image is formed in such a manner that the length of each of lines extending in the cross direction and being included in the third image corresponds to the length of each of lines extending in the cross direction and being included in the first image.

2. The image forming apparatus according to claim 1, wherein the forming unit forms at least one of the second image and the third image on the recording medium on a basis of image data that has not been subjected to gradation correction using the correction data.

3. The image forming apparatus according to claim 2, wherein, in the case where the detecting unit detects the streak portion and where the area of the streak-portion region corresponding to the streak portion in the first image is equal to or more than a predetermined area value, the forming unit forms the first image and at least one of the second image and the third image on a different recording medium, the first image being obtained by reallocating a portion corresponding to the streak-portion region in the first image, at a position on the recording medium other than a position of the streak portion.

4. The image forming apparatus according to claim 3, wherein at least one of the second image and the third image includes a plurality of images, and
wherein the forming unit forms the plurality of images at opposite positions on the recording medium, the plurality of images being located on opposite sides of the first image.

5. The image forming apparatus according to claim 2, wherein at least one of the second image and the third image includes a plurality of images, and
wherein the forming unit forms the plurality of images at opposite positions on the recording medium, the plurality of images being located on opposite sides of the first image.

6. The image forming apparatus according to claim 1, wherein, in the case where the detecting unit detects the streak portion and where the area of the streak-portion region corresponding to the streak portion in the first image is equal to or more than a predetermined area value, the forming unit forms the first image and at least one of the second image and the third image on a different recording medium, the first image being obtained by reallocating a portion corresponding to the streak-portion region in the first image, at a position on the recording medium other than a position of the streak portion.

7. The image forming apparatus according to claim 6, wherein at least one of the second image and the third image includes a plurality of images, and
wherein the forming unit forms the plurality of images at opposite positions on the recording medium, the plurality of images being located on opposite sides of the first image.

8. The image forming apparatus according to claim 1, wherein at least one of the second image and the third image includes a plurality of images, and
wherein the forming unit forms the plurality of images at opposite positions on the recording medium, the plurality of images being located on opposite sides of the first image.

9. A non-transitory computer readable medium storing a program causing a computer to function as the detecting unit and the creating unit of the image forming apparatus according to claim 1.

10. An image forming method comprising:
forming a first image and at least one of a second image and a third image on a recording medium;
detecting a streak portion in the first image by using at least one of the second image and the third image which are formed; and
in response to detecting the streak portion, creating correction data on a basis of a portion other than a streak-portion region corresponding to the streak portion in the first image,
wherein the at least one of the second image and the third image is outside of the first image,
wherein at least one of the forming, the detecting and the creating is implemented by at least one hardware processor,
wherein the second image is formed in such a manner that lines arranged in a cross direction and included in the second image correspond to lines arranged in the cross direction and included in the first image, and
wherein the third image is formed in such a manner that the length of each of lines extending in the cross direction and being included in the third image corresponds to the length of each of lines extending in the cross direction and being included in the first image.

11. An image forming apparatus comprising:
at least one hardware processor configured to implement:
a forming unit that forms a first image and at least one of a second image and a third image on a recording medium, the first image being used to create correction data for gradation correction, the second image being used to detect a first streak portion which extends in a cross direction and which is produced in the first image, the cross direction intersecting a conveying direction in which the recording medium is conveyed, the third image being used to detect a second streak portion which extends in the conveying direction and which is produced in the first image;
a detecting unit that detects at least one of the first streak portion and the second streak portion by using at least one of the second image and the third image, the second image and the third image being formed by the forming unit; and
a creating unit that, according to the detecting unit detecting the at least one of the first streak portion and the second streak portion, creates the correction data on a basis of a portion other than a streak-portion region corresponding to the at least one of the first streak portion and the second streak portion in the first image,
wherein the second image is formed in such a manner that lines arranged in the cross direction and included in the second image correspond to lines arranged in the cross direction and included in the first image,
wherein the third image is formed in such a manner that the length of each of lines extending in the cross direction and being included in the third image corresponds to the length of each of lines extending in the cross direction and being included in the first image.

* * * * *